Figures 1, 2:
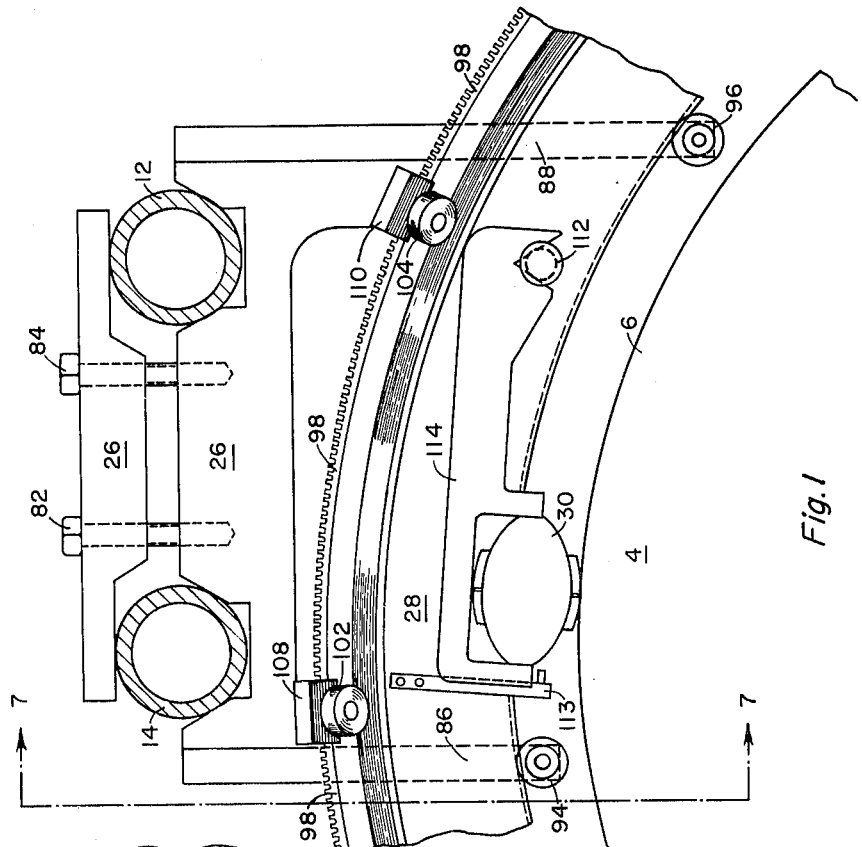

March 8, 1966   C. D. DRANSFIELD ET AL   3,239,289
BEARING

Original Filed July 17, 1958   2 Sheets-Sheet 1

INVENTORS.
CLIFFORD D. DRANSFIELD
JOHN P. WOODS
TOM PRICKETT, JR.

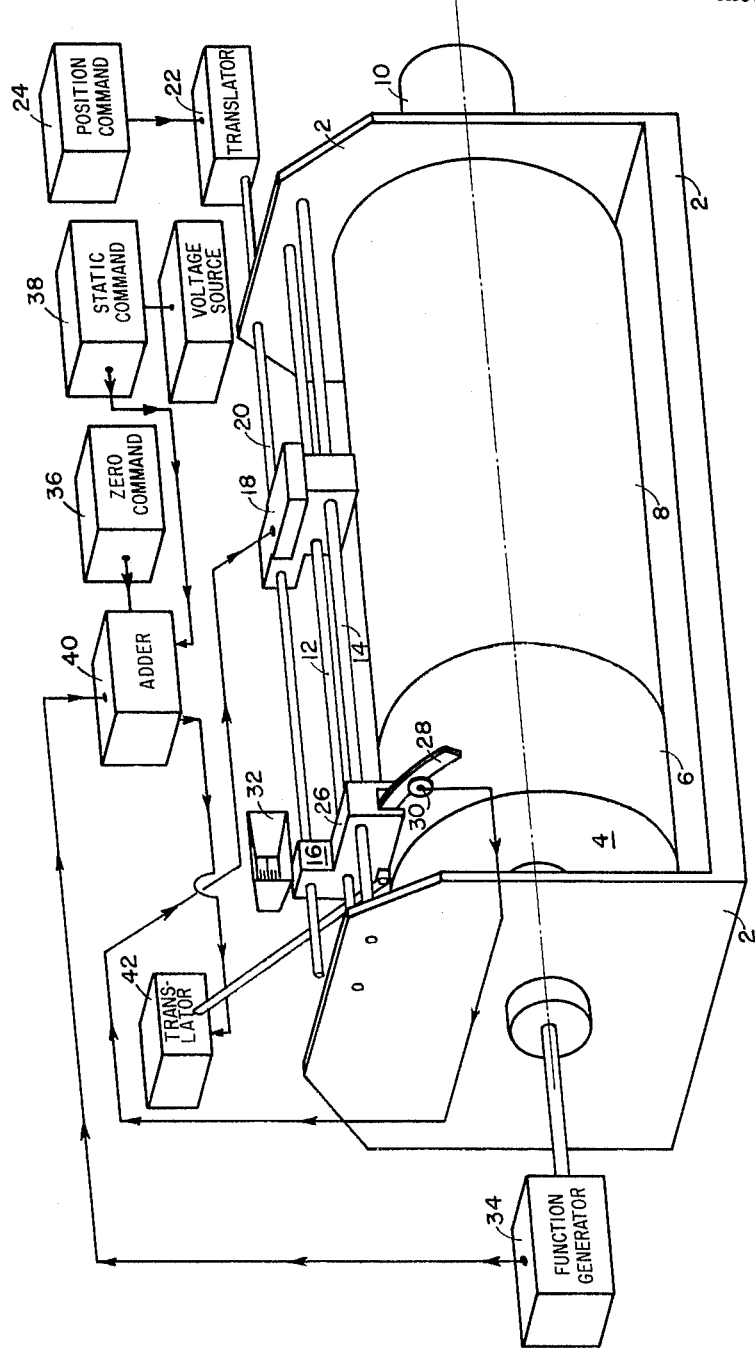

United States Patent Office

3,239,289
Patented Mar. 8, 1966

3,239,289
BEARING
Clifford D. Dransfield, John P. Woods, and Tom Prickett, Jr., Dallas, Tex.; said Woods and said Dransfield assignors to The Atlantic Refining Company, Philadelphia, Pa., a corporation of Pennsylvania
Original application July 17, 1958, Ser. No. 749,190. Divided and this application Mar. 4, 1965, Ser. No. 437,158
6 Claims. (Cl. 308—202)

This application is a division of appliction Serial No. 749,190, filed July 17, 1958, in the names of John P. Woods, Clifford D. Dransfield and Tom Prickett, Jr.

The present invention relates to apparatus for correcting seismic records obtained according to conventional seismic prospecting methods and producing from such corrected records cross section plots representing a two-dimensional view of subsurface strata. In a more particular aspect, the present invention relates to apparatus for adjusting the positions of seismic traces on a seismic record.

It has heretofore been the practice in the field of seismic prospecting to visually inspect seismic records to observe possible reflecting horizons, compute the enumerated travel time corrections, apply these corrections to each trace or a group of traces as appropriate, and finally to piece together a plurality of seismic records and plot a two-dimensional cross section of subsurface strata either in terms of true travel time or depth. Such interpretation, correction and plotting is obviously dependent upon the experience of the interpreter, including his ability to recognize significant events due to a reflecting horizon from a complex set of individual traces and the accuracy of the interpreter's application of the corrections; or, in essence, the ability of the interpreter to mentally distort, visualize and correlate significant events appearing on a plurality of individual traces and related groups of seismic records. Efforts have been made in the past to simplify such interpretation by devising mechanical drafting apparatus which will mechanically apply necessary corrections and, in some cases, prepare cross section plots of a plurality of seismic records, but such mechanical aids do not eliminate the major portion of the personal element involved and their use is time consuming.

More recently apparatus for automatically applying corrections to seismic traces and plotting cross section maps of corrected traces in their proper relation have been developed. Since depth below the surface of the earth is expressed on a seismic field record in terms of travel time, the obvious means of correcting a seismic trace to compensate for weathering, elevation, and normal moveout errors, that is, to apply static and dynamic corrections, is to apply compensating time delays prior to the plotting of the trace on a cross section map. Basically, these automatic correctors include one or more detectors adapted to scan the seismic traces on the field record and generate an equivalent signal; an auxiliary storage or re-recording system for temporarily storing seismic traces; a memory system for temporarily storing static and dynamic time delay information; a reading system for reading time delay information from the memory system; a translator for applying time delay information to the seismic traces during the process of recording on the auxiliary storage, during detection from the auxiliary storage or during transmission of the output signal from the auxiliary storage; and one or more recording elements adapted to produce a cross section plot of corrected seismic traces.

The memory systems employed in such automatic correctors are generally divided into two sections: one for the storage of static time delay information, and the other for the storage of dynamic time delay information. Static time delay information is generally stored in the form of the shaft positions of calibrated potentiometers, or simply the positions of shiftable mechanical linkages. Dynamic time delay information is most often stored in the form of a preformed mechanical cam; digital data on punched tape; an electrically conductive, plotted curve; or the shaft positions of calibrated, tapped potentiometers. Reading or detection of the stored time delay information will obviously be complementary to the storage medium employed and, accordingly, would include mechanical linkages, cam followers, electronic punched tape readers, curve followers, and automatic sequencing switches. Translation or application of the detected time delay information to the seismic traces also includes any of the generic types of time delay systems, such as, magnetic delay systems in which the auxiliary storage medium is the magnetic drum of the delay system and this is combined with a plurality of fixed transducers time-spaced about the magnetic drum together with an automatic switch responding to time delay information to switch from one head to another, movable transducers whose time position with respect to the magnetic drum is changed in accordance with time delay information, either during re-recording of the seismic traces on the auxiliary storage medium or during detection of the seismic traces from the auxiliary storage medium, or a single fixed transducer and a relatively movable auxiliary storage drum whose speed of rotation can be changed relative to that of the field record drum during re-recording or storage or relative to the cross section plotting drum during transfer from the auxiliary storage drum; multicontact electrical or electronic delay line systems switched in accordance with time delay information; and other known time delay systems.

In accordance with the invention in the parent application, it was disclosed that time or depth correlation of significant features of a plurality of seismic traces and application of each significant feature of each seismic trace to true travel time or true depth references can be accomplished by sequentially detecting the seismic traces from a field record while concomitantly changing the point on each said seismic trace at which each incremental portion of the trace is detected according to an electrical command signal which is a function of predetermined correction data.

It is an object of the present invention to provide a simple and accurate apparatus for seismic record correction.

Another and further object of the present invention is to provide an improved translating mechanism for moving a detection element about a field record mounted on a drum to dynamically change the position of the detector with respect to significant features on the seismic trace.

Still another object of the present invention is to provide an improved mechanism for moving a magnetic transducer about a drum to dynamically change the relative position of the transducer wih respect to the drum.

A still further object of the present invention is to provide an improved supporting structure for a dynamically movable magnetic transducer which is adapted to maintain proper alignment of the transducer with respect to a drum surface.

These and other objects of the present invention will be apparent from the following detailed description when read in conjunction with the accompanying drawings, wherein:

FIGURE 1 is a side view of a carriage for a movable sector carrying a recording or detecting element, FIGURE 2 is a sectional view of the carriage of FIGURE 1 taken along line 7—7 of FIGURE 6, FIGURE 3 is a schematic drawing of the preferred record corrector incorporating the present invention.

Referring in detail to FIGURE 3 of the drawings, the record corrector is made up of the basic components designated below. The entire record corrector is mounted on frame 2. Rotatable drum 4 is supported by a suitable shaft and bearings (not shown) on frame 2. Drum 4 is made up of a field record carrying portion 6 and a cross section map carrying portion 8. Drum 4 is rotated by suitable means, such as a motor 10. Bars 12 and 14 are rigidly connected to frame member 2 above drum 4. Slidably mounted on bars 12 and 14 adjacent field record portion 6 of drum 4 is detector unit 16. Detector unit 16 is electrically connected directly to recorder 18. It is desirable in most cases to include a signal amplifier in the electrical line connecting detector unit 16 and recorder 18, and depending upon the form in which the seismic trace is recorded, some form of signal converter, such as a demodulator. However, these elements are conventional, and their inclusion or exclusion would be obvious to one skilled in the art. Accordingly, in referring to a "direct electrical connection" between detector unit 16 and recorder 18, such necessary components are assumed to be included, and the direct electrical connection between detector unit 16 and recorder 18 is meant to exclude only auxiliary transfer mediums on which the seismic signal is stored prior to or during the process of correction, as is the universal practice in all prior art automatic record correctors. Recorder 18 is also slidably mounted on bars 12 and 14 and is, of course, mounted adjacent cross section map portion 8 of drum 4. Bar 20 is slidably mounted on frame member 2 above drum 4 and is coupled to detector unit 16 and recorder 18 in a manner such that detector unit 16 and recorder 18 may be moved parallel to the axis of drum 4 in predetermined, discrete steps following the detection and recordation of each successive seismic trace. Appropriate motion is imparted to bar 20 by translator 22 which is adapted to convert a received electrical command signal to mechanical motion. The electrical command signal to translator 22 is supplied by position command 24.

Detector unit 16 includes frame member 26, sector 28 and pickup element 30. Sector 28 is slidably mounted on frame member 26 in such a manner that sector 28 will describe an arcuate path about field record portion 6 of drum 4. Pickup element 30 is mounted on sector 28 closely adjacent to field record portion 6 of drum 4. Frame member 26 of detector unit 16 also carries visual display mechanism 32 which continuously provides a visual representation of the position of pickup element 30 relative to a selected reference point.

Function generator 34 is adapted to produce a varying voltage proportional to the dynamic correction factor $Y = f(X)$ and is preferably directly coupled to the shaft of drum 4 for reasons which will be discussed hereinafter. As stated previously, the variable function represented by the command voltage of function generator 34 introduces a dynamic correction which varies along the length of each seismic trace either continuously or in discrete steps. Zero command 36 is adapted to produce a voltage proportional to a predetermined difference between a selected reference point on the field record and a fixed reference point along the variable function, a fixed reference point on the cross section map, a like fixed reference point, or a combination of such fixed reference points. Static command 38 is adapted to produce at least one non-varying or constant voltage proportional to a static correction which is the same throughout the length of each seismic trace but in some instances differs for each trace. Accordingly, a separate and distinct voltage should be provided for each seismic trace, and the appropriate voltage must be applied to each succeeding trace following the detection and recordation of each previous trace, as will be more fully explained hereinafter.

The voltages produced by function generator 34, zero command 36, and static command 38 are combined or algebraically added by adder 40. The output voltage of adder 40 is in turn fed to translator 42 which is adapted to convert this command voltage to mechanical motion. This mechanical motion is employed to slide sector 28 in its support and describe an arcuate path about field record portion 6 of drum 4. Obviously, this movement of sector 28 will serve to change the spatial relationship between pickup element 30 and a seismic trace passing a given point at a constant speed and pick up significant features of a seismic trace earlier or later than they would be picked up by a fixed pickup element. It is to be observed that, in contrast to this ability of the movable pickup of this invention to apply "positive or negative" corrections, i.e., to advance or delay a feature of the record, the prior art correctors referred to previously are restricted to correction by delay only.

FIGURE 1 of the drawings, partially in section, shows the details of the carriage of sector 28 and the mounting on sector 28 of pickup element 30. FIGURE 2 is an end view partially in section taken along line 7—7 of FIGURE 1.

Referring specifically to FIGURES 1 and 2, frame member 26 of detector unit 16 is fixed or slidably mounted on tubular members 12 and 14 by means of bolts or other securing means 82 and 84. Depending from frame member 26 and forming a part thereof are legs 86 and 88, respectively. Rotatably mounted in depending leg 86 is adjustment pin 90 having an extension 92 formed on the end therof eccentric to the center line of pin 90. Mounted on eccentric extension 92 is roller bearing 94. Roller bearing 96 is similarly mounted on the end of leg 88. Formed in the bottom of sector 28 is a raceway in which roller bearings 94 and 96 ride. Mounted in the top edge of sector 28 is nylon gear section 98. Lateral extensions near the top of sector 28 are milled at an oblique angle of 45 degrees from a center line passing through sector 28 and gear segment 98. In rolling contact with the oblique extensions of sector 28 are roller bearings 100, 102, 104 and a bearing complementary to 104 (not shown). Roller bearings 100 and 102 are fixedly mounted on support block 108 which is secured to the bottom of frame member 26. Roller bearing 104 and the corresponding roller bearing on the opposite side (not shown) are mounted on support block 110 which is also attached to frame member 26. Protruding from the side of sector 28 is fulcrum 112. Fulcrum 112 has formed therein a groove adapted to carry lever arm 114. Pickup element 30 is rigidly mounted on lever arm 114 in a manner such that pickup 30 rides freely on the surface of field record section 6 of drum 4. Pickup support 113 is adjustably mounted on sector 28 so that it can be raised to thereby lift pickup 30 from the surface of the record when not in use.

It will be apparent from observation of the arrangement of parts of FIGURES 1 and 2 that sector 28 can be adjusted to place proper bearing weights at its points of contact with bearings 100, 102 and 94 by simply adjusting rotatable pin 90 which, in turn, adjusts the height of bearing 94 due to the eccentric mounting of the bearing 94 on pin 90. The placement of roller bearings 100 and 102 at 45 degree angles to the center line passing through sector 28 and bearing 94 forms a Y configuration which provides perfect and accurate alignment of sector 28 and prevents any side movement of the sector.

Pickup element 30 is shown in FIGURES 6 and 7 to be a magnetic transducer which rides on drum 4 with a bearing weight substantially equal to the weight of pickup element 30 itself since it has been found that by properly locating fulcrum 112 on sector 28 the weight of arm 114 can be balanced about the fulcrum. By mounting pickup 30 in this manner it may be seen that pickup 30 is free to follow any discontinuities in the surface of drum 4 or the magnetic field tape, yet this is accomplished by having a minimum of bearing weight between pickup 30 and drum 4 and consequent wear on pickup 30 or the field tape is eliminated.

It will be obvious to those skilled in the art that auxiliary components may be added and other modifications may be made without departing from the present invention. Therefore, the specific examples set forth herein and the specific modes of operation described are meant to be by way of illustration only and not by way of limitation, and applicants' invention is to be limited only in accordance with the limitations of the claims hereinafter set forth.

We claim:

1. Apparatus for supporting a movable sector above the surface of a curved member comprising
   (a) a frame means having at least two leg members,
   (b) at least two fixedly positioned bearing members mounted on said frame means in a manner such that their bearing surfaces form the upper extremities of a Y configuration, and
   (c) at least one third bearing member mounted on each leg member in a manner such that the bearing surfaces of said third members form the lower extremity of said Y configuration.

2. Apparatus in accordance with claim 1 wherein the frame means is slidably mounted on a support means.

3. Apparatus in accordance with claim 1 wherein the frame means is fixed on a support means.

4. Apparatus in accordance with claim 1 wherein at least one of the third bearing members is adjustably mounted on one of the leg means.

5. Apparatus in accordance with claim 1 wherein the movable sector is positioned under the two fixedly positioned bearing members and above the third bearing members.

6. Apparatus for supporting a movable sector above the surface of a curved member comprising
   (a) a frame means,
   (b) at least two fixedly positioned bearing members mounted on said frame means in a manner such that their bearing surfaces form the upper extremities of a Y configuration,
   (c) at least one rotatable support element mounted on said frame member adjacent the lower extremity of said Y configuration, and
   (d) at least one third bearing member mounted on said support element eccentric to the center of rotation of said support element and whose bearing surface forms the lower extremity of said Y configuration.

References Cited by the Examiner
UNITED STATES PATENTS 2,818,683  1/1958  Nieman et al. _____ 308—203

DON A. WAITE, *Primary Examiner.*